United States Patent [19]
Lin et al.

[11] Patent Number: 6,069,973
[45] Date of Patent: May 30, 2000

[54] METHOD AND APPARATUS FOR COLOR CORRECTION IN A MULTI-CHIP IMAGING ARRAY

[75] Inventors: Ying-wei Lin, Penfield; Hong Li, Webster, both of N.Y.

[73] Assignee: Xerox Corporation, Stamford, Conn.

[21] Appl. No.: 09/106,750

[22] Filed: Jun. 30, 1998

[51] Int. Cl.[7] .............................. H04N 1/48; H04N 1/60; H04N 9/67; G06K 9/60

[52] U.S. Cl. ..................... 382/167; 382/260; 358/504; 358/513; 358/514; 358/516; 358/533; 358/406; 348/243; 348/246; 348/241; 348/251

[58] Field of Search ................................. 358/514, 504, 358/533, 406, 503; 382/167, 260; 348/251, 241, 244, 246, 243

[56] References Cited

U.S. PATENT DOCUMENTS

| | | |
|---|---|---|
| 4,814,296 | 3/1989 | Jedlicka et al. . |
| 5,148,268 | 9/1992 | Tandon et al. . |
| 5,285,293 | 2/1994 | Webb et al. ............................. 358/471 |
| 5,452,001 | 9/1995 | Hosier et al. ........................... 348/230 |
| 5,684,523 | 11/1997 | Satoh et al. ............................ 347/247 |
| 5,917,621 | 7/1998 | Yushiya .................................. 358/518 |
| 5,990,920 | 11/1999 | Nagumo et al. ....................... 347/237 |

*Primary Examiner*—Edward L. Coles
*Assistant Examiner*—Coulter Henry, Jr.
*Attorney, Agent, or Firm*—Oliff & Berridge, PLC

[57] ABSTRACT

A method for calibrating a multi-chip image sensor, and an imaging system having a multi-chip sensor that includes color correction factors generated by such a method. The image sensor is successively controlled to image three different test targets. After imaging each target, a set of correction factors is generated and used to correct image signals generated when imaging the next test target. A first set of correction factors corrects for pixel-to-pixel variations between imaging elements in the array. The second set of correction factors corrects for chip-to-chip variations between chips in the array. The third set of correction factors corrects for array-wide variations compared to a standard color chart.

20 Claims, 5 Drawing Sheets

METHOD AND APPARATUS FOR COLOR CORRECTION IN A MULTI-CHIP IMAGING ARRAY

BACKGROUND OF THE INVENTION

1. Field of Invention

This invention generally relates to color correction for a multi-chip color imaging array.

2. Description of Related Art

Some color scanning devices or other imaging devices, such as color copiers, use a multi-chip, full-width imaging array (FWA) to image documents or other images. Since the FWA typically spans across an entire document, the FWA is made from a plurality of imaging chips that are bonded together. Because of variations in image sensors within each chip, the image sensors in the FWA must be calibrated so that the image signal output by the FWA accurately represents a scanned document.

For example, a known method for calibrating an FWA involves imaging a white calibration target with the FWA and generating correction values for each pixel. The correction values are used to adjust the image signal output by each image sensor in the FWA so that a desired image signal is output by each image sensor in the FWA when imaging the white calibration target. This procedure is commonly used for monochrome (i.e., B/W) image sensors.

SUMMARY OF THE INVENTION

For color FWA's, color calibration is also needed. The color calibration procedures involve imaging a color target having a plurality of different color patches having a known density, hue and saturation, and generating color calibration values that are used to convert image signals output by the image sensors in a first color space, e.g., RGB, which varies from scanner to scanner, to a second color space, e.g., CIEXYZ, which is a standard color space. This calibration step is also called color correction or color characterization. The standard color calibration procedure is adequate where the color responses of different sensor elements are equal. However, in a FWA, the color response of sensor elements could be different from chip to chip due to variation of color filter thickness, etc. Therefore, a different color calibration is needed for each chip. Different calibration values for each chip in the FWA can be generated using a simple extension of the standard procedure, but it requires a very complicated color calibration target. Typically, the color calibration target has approximately 200 different color patches, and a typical FWA consists of approximately 20 chips. Therefore the special test target will have approximately 4000 different color patches, and so the target is quite difficult to construct. Accordingly, a simpler color calibration procedure that eliminates the need for such special color calibration targets is needed. The chip to chip color response difference can be ignored, but then visible banding could occur on the scanned image and cause image quality degradation.

The invention provides a method for calibrating a multi-chip sensor array whereby the sensor array images a first target to correct for pixel-by-pixel signal variations for all sensors in the array. A first set of correction factors are generated to adjust the signals output by each sensor. Using the first set of correction factors, the sensor array images a second calibration target to correct for chip-to-chip sensor variations. The signals output by each sensor are adjusted using the first set of correction factors and, a second set of correction factors is generated for each chip based on the adjusted signals. Using the first and second sets of correction factors, the sensor array images a third calibration target and outputs adjusted signals. Based on the adjusted signals output by each of the sensors, a set of array-wide correction factors is generated. Accordingly, three sets of correction factors are generated and used to correct signals output by each sensor in each chip in the multi-chip array.

In one aspect of the invention, the second set of correction factors is generated by averaging signals output by the sensors in each chip, and averaging the average chip values for chips in the array to generate an average array value. The average array value is compared to each average chip value, and the second set of correction factors is generated for each chip based on the comparison.

The invention also provides a method for generating color correction factors in a multi-chip image sensor wherein a first set of correction factors that correct for pixel-to-pixel variations is generated. Using the pixel-to-pixel correction factors, correction factors that correct for chip-to-chip variations are generated. Based on both the pixel-to-pixel and chip-to-chip correction factors, an array-wide correction factor is generated.

In one aspect of the invention, customized chip-to-chip correction values are generated based on the chip-to-chip correction factors and the array-wide correction factor.

The invention also provides a multi-chip image array comprising correction means for storing correction factors and adjusting image signals output by each image sensor based on the correction factors. The stored correction factors are generated by controlling the array to image a first test pattern and output signals from each of the image sensors in the array. Based on the output signals, a first set of correction factors is generated to correct for pixel-to-pixel variations in the array. Using the first set of correction factors, the image array is controlled to image a second test pattern and output signals from each of the image sensors in the array. Based on the output signals, a second set of correction factors is generated that corrects for chip-to-chip variations in the array. Using the first and second sets of correction factors, the image array is controlled to image a third test pattern and output signals from each of the image sensors in the array. Based on the output signals, an array-wide correction factor is generated that converts the multi-chip array output signal from its own color space to a signal in a standard color space.

BRIEF DESCRIPTION OF THE DRAWINGS

The invention will be described in relation to the following drawings in which reference numerals refer to like elements, and wherein.

DETAILED DESCRIPTION OF PREFERRED EMBODIMENTS

Figure 1:
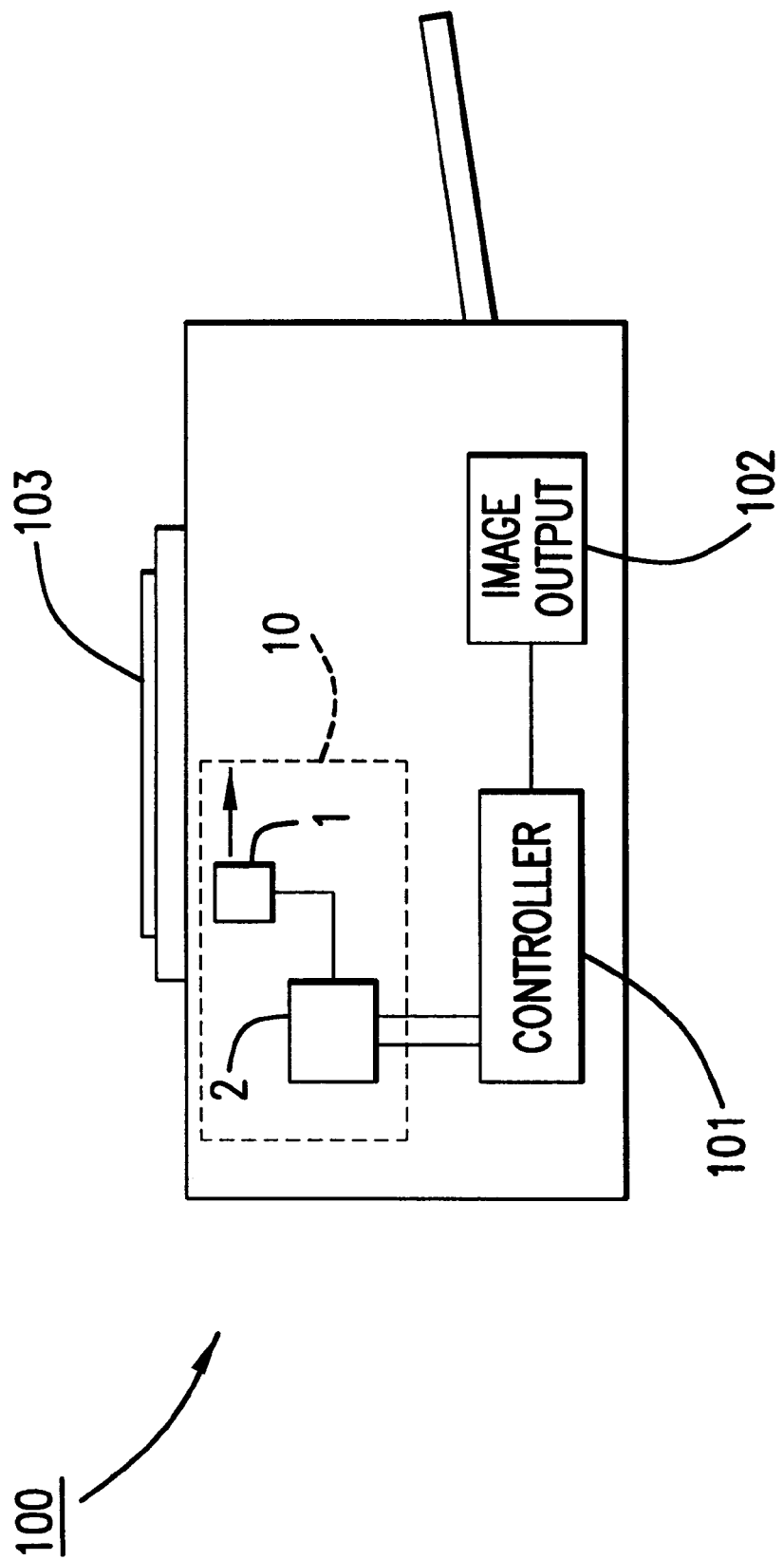
FIG. 1 is a schematic block diagram of a color copier.

FIG. 1 is a highly schematic drawing of color copier 100. The copier 100, as is well known, is used to image a document 103 and output an image on paper or another substrate based on the document 103 image. The copier 100 includes an imaging device 10 that includes a multi-chip imaging array 1 and a data processor 2 for sensing the image on the document 103 and outputting signals representative of the image to a controller 101. Based on the signals, the controller 101 controls the image output 102 to create a copy of the document 103 image.

Although the imaging device 10 is shown as incorporated into a copier 100, the imaging device 10 can be a stand-alone device, such as a hand-held scanner or incorporated into a larger imaging system such as the copier 100, a scanner, digital camera, or personal computer, etc. or an assembly of such devices.

Likewise, although the imaging device 10 is shown as including a data processor 2, the data processor 2 functions could be performed by other elements in the controller 101 and/or the imaging array 1. Thus, the data processor 2 can be eliminated as a separate element, as discussed more fully below.

The imaging array 1 communicates with the data processor 2 that preferably controls the operation of the imaging array 1 and receives image signals from the imaging array 1 representative of a sensed image. The data processor 2 also has input and output ports for inputting control information or other signals from other devices or sources, such as the controller 101, a programmed general purpose computer or user interface (not shown), and outputting image data representing a scanned document 103 or other image.

The data processor 2 can perform additional functions such as providing required electrical power to the imaging array 1, generating and/or providing image signal correction data, or other image processing functions. Such image processing functions can include A/D and/or D/A conversion, conversion of image data from one color space to another color space, e.g., from RGB to CIEXYZ, image enhancement, noise reduction, image signal compression, color correction, etc. In short, the data processor 2 can perform any image processing functions that can be performed on image data.

The data processor 2 can be implemented as a single special purpose integrated circuit (e.g., ASIC) or an array of ASICs, each having a main or central processor section for overall, system-level control, and separate sections dedicated to performing various different specific computations, functions and other processes under the control of the central processor section. The data processor 2 can also be implemented using a plurality of separate dedicated or programmable integrated or other electronic circuits or devices, e.g., hard-wired electronic or logic circuits such as discrete element circuits or programmable logic devices (including PLDs, PLAs, PALs or the like). In general, any device or assembly of devices capable of performing desired control and data processing functions in conjunction with generating image data using an imaging device can be used. The data processor 2 also preferably includes other circuitry, components or devices, such as memory, relays, mechanical linkages, communications devices, etc. to effect desired control and/or input/output functions.

Figure 2:
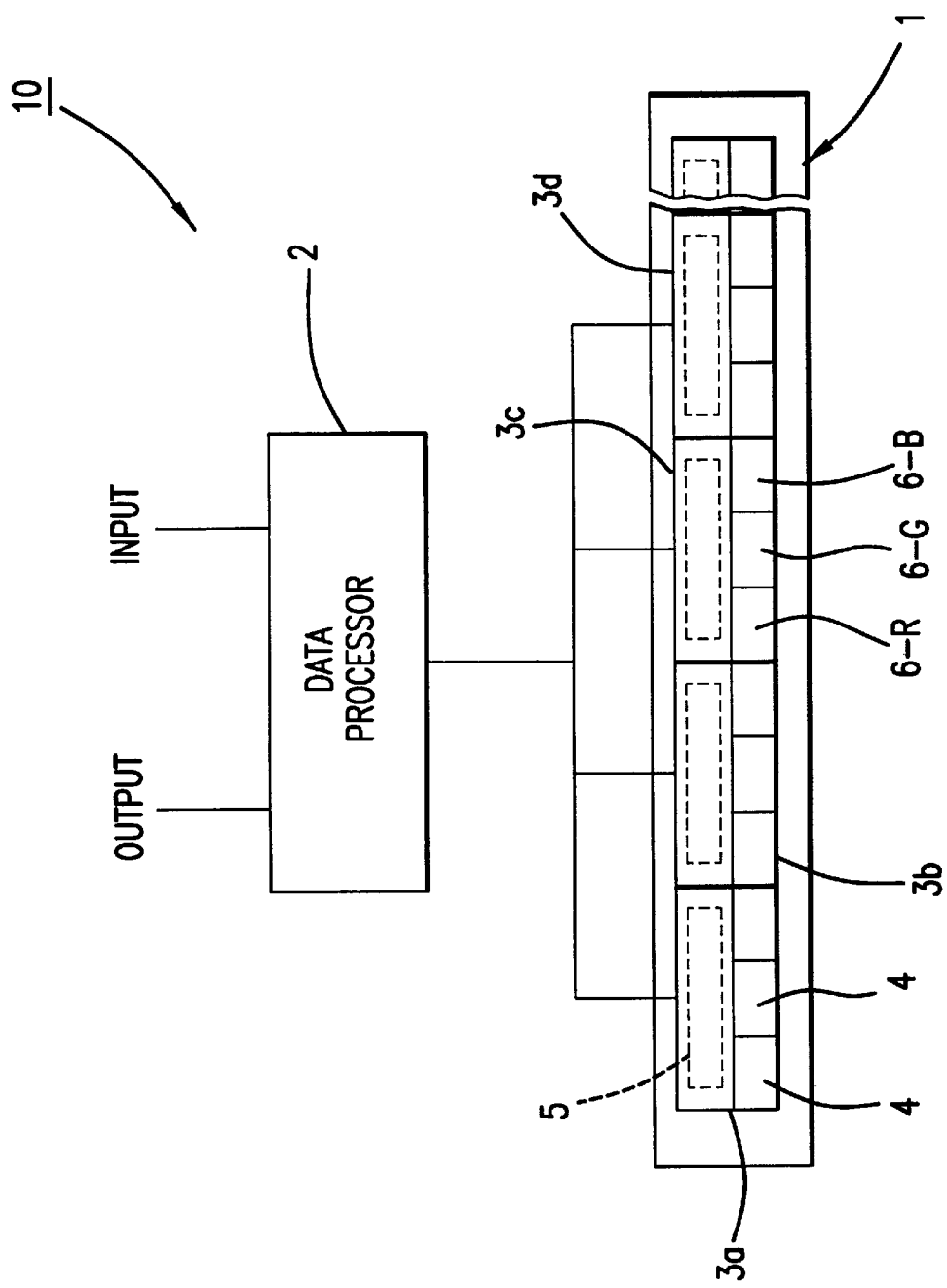
FIG. 2 is a schematic diagram of an imaging system.

FIG. 2 shows the imaging device 10 with a portion of the imaging array 1. The multi-chip imaging array I has a plurality of chips 3 bonded together or otherwise arranged to preferably form a full-width array (FWA). However, the imaging array 1 need not be a FWA, i.e. the imaging array 1 need not span across the entire width of a scanned document 103 or other image. The portion of the imaging array 1 shown in FIG. 2 has four chips 3, but the imaging array 1 can include many more, or fewer chips 3 as desired. Each chip 3 has a plurality of imaging elements 4 arranged in a row on the chip 3. The imaging elements 4 are preferably silicon photodiodes, but can include other imaging devices, such as CCD elements, CMOS imaging devices, or other light sensitive or other sensor elements. In addition, although the imaging elements 4 are shown as positioned in a row on the chips 3, the imaging elements 4 can be positioned on the chip 3 in other patterns. Also, although each chip 3 is shown having one row of imaging elements 4, each chip 3 may include more or less rows of imaging elements 4. For example, rather than having each chip 3 have one row of imaging elements 4, each chip 3 could have three rows of imaging elements 4, and the chips 3 could be differently arranged to achieve a desired imaging element 4 pattern.

Each chip 3 preferably includes a controller and signal processor section 5 that controls the operation of the imaging elements 4, processes the signals produced by each imaging element 4, e.g., A/D converts analog signals output by each imaging element 4, and outputs the processed signals from the chip 3. Because the chip 3 is preferably a semiconductor device, the controller and signal processor section 5 can be formed directly in, on, or over the chip 3. However, the controller and signal processor section 5 could be separately manufactured and attached to the chip 3. Alternately, the controller and signal processor section 5 can be eliminated and its functions performed by the data processor 2 or some other device.

Each chip 3 also preferably has color filters 6 formed over each imaging element 4. Preferably, the color filters 6 have three colors, red, green and blue. In this embodiment, the color filters 6 form patches of color filters 6-R, 6-G and 6-B across the imaging array 1 that correspond to each of the colors red, green and blue. Thus, the imaging elements 4 associated with the color filter 6-R output a signal representative of an amount of red light that strikes the imaging elements 4. Likewise, the other imaging elements 4 associated with the color filters 6-G and 6-B detect and output signals representative of green and blue light. Although red, green and blue are used in this embodiment, other colors can be used as desired. In addition, the color filter 6 pattern on the imaging array 1 need not be in the form of alternating patches arranged in a direction parallel to the length-wise direction of the imaging array 1. Instead, the color filters 6 can be arranged in other ways on the imaging array 1, like a checkerboard pattern, such as the well-known Bayer pattern, or other desired patterns.

Other details of the structure and operation of the imaging device 10 are not provided here since these details are well known to those of skill in the art. For example, please see U.S. Pat. No. 4,814,296 and 5,148,268 which are incorporated herein by reference in their entirety.

Variations in chip 3 manufacture cause each of the imaging elements 4 to typically output different signals, even when the imaging elements 4 are illuminated by light of the same color and intensity. Often, variations are caused by different color filter 6 thicknesses, but the variations can be caused by other factors. Accordingly, the imaging array 1 is preferably calibrated so that the imaging array 1 outputs image signals that are an accurate representation of a scanned document or image.

Figure 3:
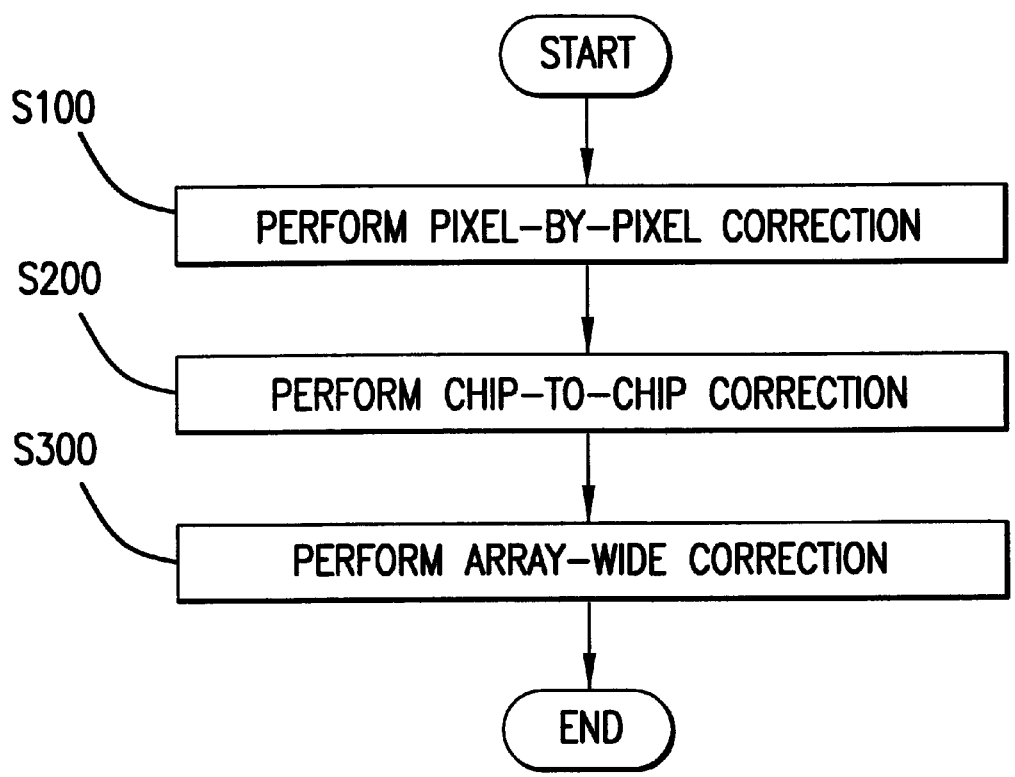
FIG. 3 is a flow chart of steps for generating correction factors for a multi-chip imaging array.

FIG. 3 shows a preferred method for calibrating an imaging device, such as the imaging device 10 shown in FIG. 1. In step S100, pixel-to-pixel correction is performed.

That is, at least one correction factor is generated for each imaging element 4 to correct for pixel-to-pixel variations in the chips 3 in the imaging array 1. Thus, using the pixel-wise correction factors, the imaging elements 4 in the imaging array 1 will output uniform desired image signals when the imaging array 1 scans a uniform target, e.g., a uniform white target.

In step S200, chip-to-chip correction is performed for the imaging array 1 to correct for chip-to-chip variations. These variations are typically caused by non-uniformity in the color filter 6 coating thickness on each chip 3. However, chip-to-chip variations can be caused by other factors. In this step, correction factors are generated for each chip 3, so that the chips 3 output uniform image signals as desired when a color target, e.g., a red, green and/or blue target, is scanned by the imaging array 1.

In step S300, array-wide correction is performed. This step in the calibration procedure ensures that the imaging array 1 outputs image signals that accurately represent detected colors relative to a universal standard. That is, correction factors are generated to correct the image signals output by the imaging array 1 so that when the imaging array 1 images a calibration target having color patches of known color, the calibration factors adjust the image signals output by the imaging array 1 to be consistent with a universal color standard.

Figure 4:
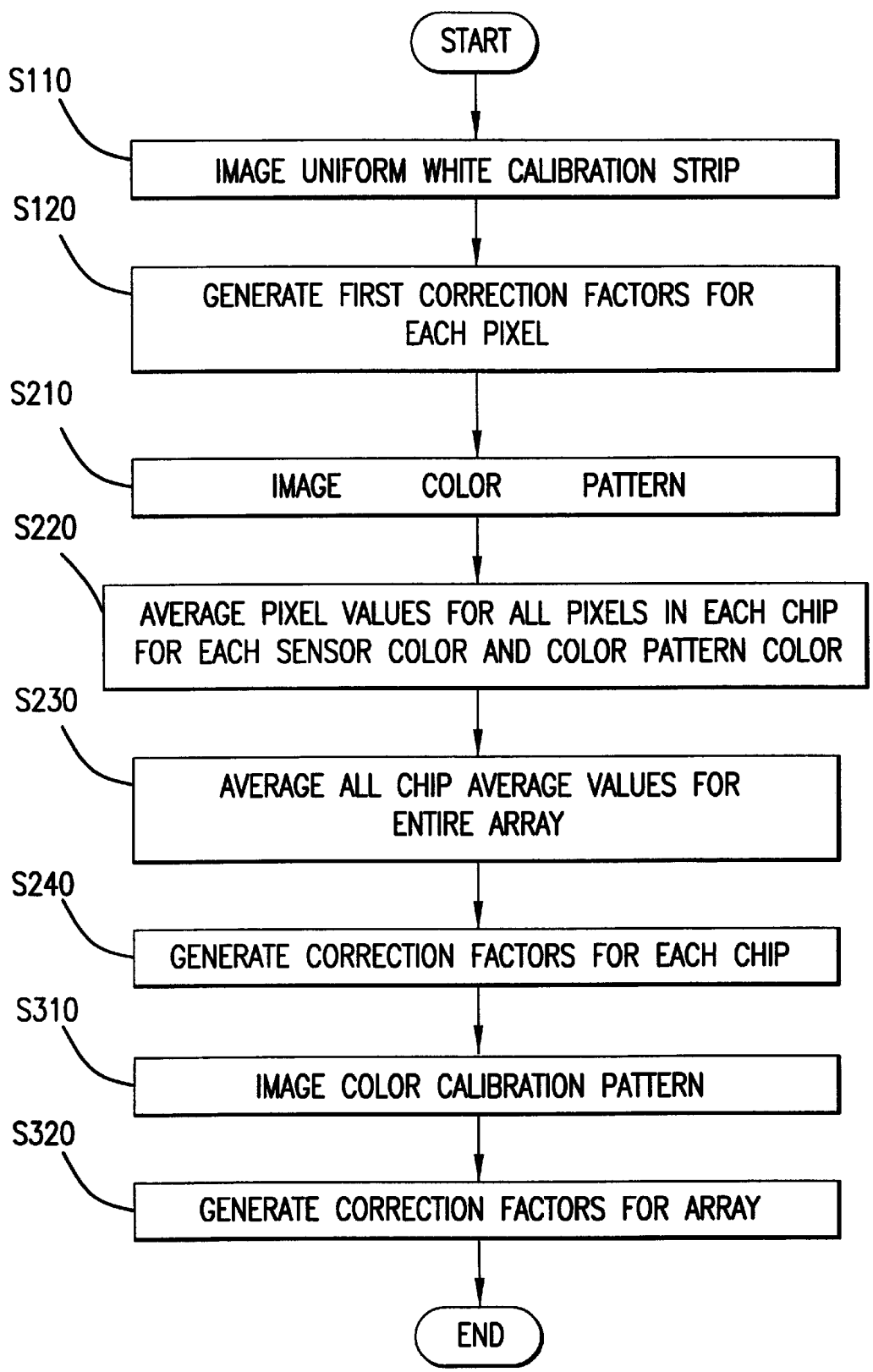
FIG. 4 is a flow chart showing steps for generating correction factors for a multi-chip imaging array in accordance with a preferred embodiment of the invention.

Having provided a broad description of one aspect of the invention, a more detailed aspect of the invention is described with reference to FIG. 4. The FIG. 4 flow chart is described in connection with calibrating the imaging device 10 of FIG. 2.

In step S110, the imaging device 10 is controlled to image a uniform white calibration strip and output image values from each imaging element 4. Preferably, the data processor 2 outputs A/D converted uncorrected RGB image signals from each of the chips 3 for analysis by a separate data processing device, such as a programmed general purpose computer. However, the data processor 2 need not output the image signals and can perform the desired analysis of the signals.

In step S120, the image signals are analyzed and first correction factors for each imaging element 4 are generated. Since the image signals are generated by imaging a uniform white calibration strip, the correction factors are preferably generated so as to make all of the image signals from the imaging elements 4 the same. Accordingly, correction factors are generated for each imaging element 4 to make appropriate gain and offset correction to the image signals such that all of the image signals are corrected to a desired level. The first correction factors are provided to the data processor 2, if the correction factors are generated by an analysis device separate from the data processor 2. Otherwise, the data processor 2 generates and stores the correction factors in a memory in the data processor 2 or in the controller and signal processor section 5 on each chip 3. Thus, the first correction factors are used to correct the image signals generated by each imaging element 4. Although the correction factors can be stored in the data processor 2 or the controller and signal processor section 5, the correction factors can be programmed into logic devices or otherwise hard-wired into the imaging device 10 to effect desired image signal correction.

Figure 5:
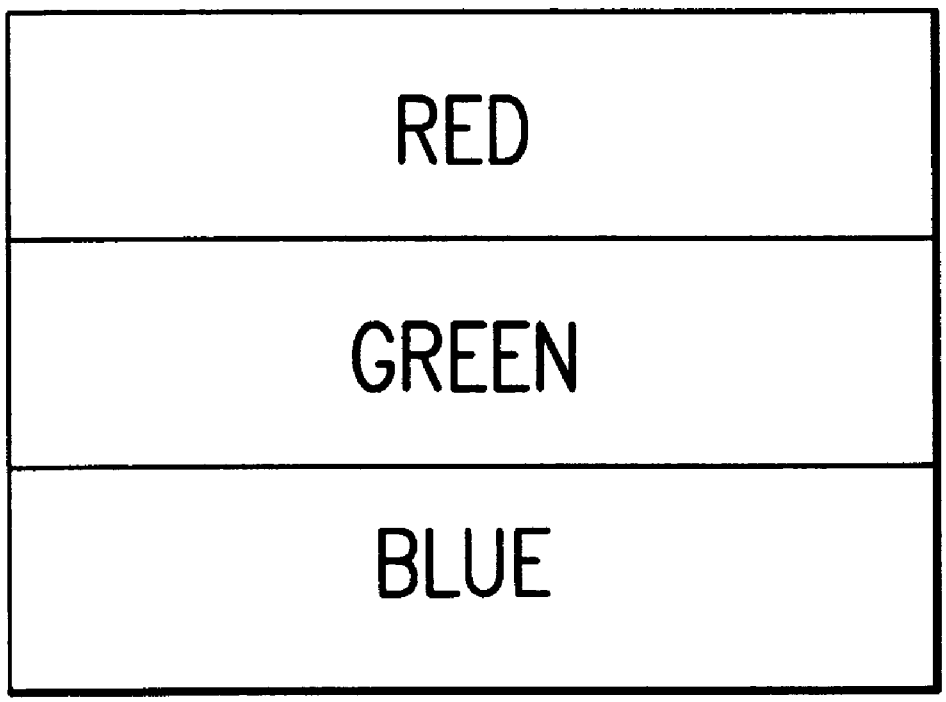
FIG. 5 is a sample color pattern for performing chip-to-chip color correction in a preferred embodiment of the invention.

In step S210, the imaging device 10 is controlled to image a color pattern and generate image signals for each imaging element 4. A preferred color pattern is shown in FIG. 5 and has three stripes of saturated red, green and blue. The color of the stripes could be other than red, green, and blue, as long as they span the color space adequately. Preferably, the imaging device 10 is controlled such that each of the imaging elements 4 images a portion of each color stripe in the color pattern several times. Accordingly, each imaging element 4 outputs one image signal for each color on the pattern that is imaged.

In step S220, the image signals for each imaging element 4 are averaged over each chip 3 for each sensor color. That is, the image signals for all red imaging elements 4, i.e. imaging elements 4 associated with a red color filter 6, in the chip 3 are averaged. Likewise, the averaged image signals for the green and blue imaging elements 4 are also averaged for all green and blue imaging elements 4 in the chip 3. Since in this embodiment each chip 3 has red, green and blue imaging elements 4, and each of the imaging elements 4 images red, green and blue from the color pattern, a set of 9 averaged image signals (three color strips X three sensor colors) is generated for each chip 3.

For example, a 3×3 matrix of averaged image signals is generated for each chip 3:

$$\begin{bmatrix} R_a & R_b & R_c \\ G_a & G_b & G_c \\ B_a & B_b & B_c \end{bmatrix}$$

where R, G and B represent averaged image signals output by red, green and blue imaging elements 4, and a, b, c represent the corresponding color pattern color, e.g., "a" corresponds to saturated red, "b" to saturated green and "c" to saturated blue. Thus, the average image signal value for all red imaging elements 4 in a chip 3 when imaging saturated red is $R_a$.

In step S230, the 9 averaged image signals for each chip 3 are averaged for preferably all, or some other desired number, of chips 3 in the imaging array 1. In this example, a matrix of 9 array-wide averaged image signals is generated:

$$\begin{bmatrix} R_a^\circ & R_b^\circ & R_c^\circ \\ G_a^\circ & G_b^\circ & G_c^\circ \\ B_a^\circ & B_b^\circ & B_c^\circ \end{bmatrix}$$

where ° represents an array-wide average for the corresponding signal.

In step S240, the 9 array-wide averaged image values, called target values, are compared to the respective 9 averaged image signals for each chip 3 generated in step S220. Based on the comparison, one 3×3 matrix of correction factors $m_{chip}$ is generated for each chip 3 and is used to correct the image signals output by each imaging element 4 after the signals are corrected using the first set of correction factors.

In this example, a matrix $m_{chip}$ is generated for each chip 3 such that:

$$[m_{chip}] = \begin{bmatrix} R_a^\circ & R_b^\circ & R_c^\circ \\ G_a^\circ & G_b^\circ & G_c^\circ \\ B_a^\circ & B_b^\circ & B_c^\circ \end{bmatrix} \begin{bmatrix} R_a & R_b & R_c \\ G_a & G_b & G_c \\ B_a & B_b & B_c \end{bmatrix}^{-1}$$

Therefore, for a given input color "d", the output Rd, Gd, Bd from a group of imaging elements 4 defining a pixel is corrected by:

$$\begin{bmatrix} R_d^\circ \\ G_d^\circ \\ B_d^\circ \end{bmatrix} = [m_{chip}] \begin{bmatrix} R_d \\ G_d \\ B_d \end{bmatrix}$$

If the chips 3 in the imaging array 1 are uniform, i.e., there are no chip-to-chip variations, the 3×3 matrix $m_{Chip}$ for each chip 3 is nearly an identity matrix. The 3×3 matrices $m_{chip}$ of correction factors for each chip 3 are stored in the data processor 2, or in the controller and signal processor section 5, or otherwise used by the imaging device 10 to correct the image signals output by each chip 3.

In step S310, the imaging device 10 is controlled to image a color calibration pattern, which preferably is a Q60 target. This color calibration pattern preferably includes 236 different color patches having known density, hue and saturation values. In this example, the image signals output by each imaging element 4 are corrected using an appropriate first correction factor and 3×3 matrix $m_{chip}$, and output to the data processor 2 or other device for analysis. By comparing each of the corrected image signals to a desired image signal, a 3×3 matrix $M_o$ of array-wide correction factors for the imaging array 1 is preferably generated. However, the correction factors could be in the form of a 3×6 matrix, a neural network, etc. The correction factors in the array-wide 3×3 matrix $M_o$ preferably converts the corrected RGB image signals from the imaging array 1 to CIEXYZ values such that:

$$\begin{bmatrix} X \\ Y \\ Z \end{bmatrix} = [M_0] \begin{bmatrix} R^\circ \\ G^\circ \\ B^\circ \end{bmatrix}$$

Preferably, the array-wide 3×3 matrix $M_o$ is multiplied by each of the 3×3 matrices $m_{chip}$ for each chip 3 in the imaging array 1 to generate a custom calibration matrix $M_{chip}$ that is stored or otherwise used in the imaging device 10 to correct image signals output from each corresponding chip 3 such that:

$$[M_{chip}] = [M_0][m_{chip}]$$

However, this additional step is not necessary and can be eliminated.

Although the invention has been described in connection with an imaging array 1 that outputs RGB image signals, the invention can be used with imaging arrays that output other image signal types. For example, the imaging array could output image signals corresponding to the known color scheme CMY or other schemes that use different colors or more or less than three different colors. If the imaging array 1 uses color schemes other than RGB, the color pattern used to generate the chip-wise correction factors should be changed accordingly. In addition, if the imaging array 1 uses more than three colors, differently sized correction factor arrays should be used. For example, if the imaging array 1 uses four different colors, 4×4 matrices of correction factors for each chip should be generated, rather than the 3×3 matrices discussed above.

While this invention has been described in conjunction with the specific embodiments outlined above, it is evident that many alternatives, modifications and variations will be apparent to those skilled in the art. Accordingly, the preferred embodiments of the invention as set forth above are intended to be illustrative and not limiting. Various changes may be made without departing from the spirit and scope of the invention as defined herein.

What is claimed is:

1. A method for calibrating a multi-chip RGB image sensor, comprising the steps of:
   controlling the image sensor to image a white calibration target and output at least one red, green and blue image signal from each chip in the array;
   analyzing the image signals;
   generating a correction factor for each imaging element in each chip based on a result of analyzing the image signals;
   controlling the image sensor to image a test target having one stripe each of red, green and blue, and output a second set of red, green and blue image signals from each chip;
   analyzing the second set of image signals;
   generating a correction factor matrix for each chip based on a result of analyzing the second set of image signals;
   controlling the image array to image a third test target having a plurality of color patches, and output a third set of red, green and blue image signals from each chip;
   analyzing the third set of image signals; and
   generating a matrix of correction factors for the array based on a result of analyzing the third set of image signals.

2. The method of claim 1, further comprising the steps of:
   correcting the second set of image signals based on the correction factors for each imaging element; and
   correcting the third set of image signals based on an appropriate matrix of correction factors for each chip.

3. The method of claim 1, wherein the step of analyzing the second set of image signals comprises averaging the red, green and blue image signals for each chip to obtain an averaged red, green and blue image signal for each chip.

4. The method of claim 3, wherein the step of analyzing the second set of image signals comprises averaging the averaged red, green and blue image signals for a plurality of chips in the array to obtain an averaged red, green and blue image signal for the plurality of chips.

5. The method of claim 4, wherein the step of generating a matrix of correction factors for each chip comprises comparing the averaged red, green and blue image signals for the plurality of chips to the averaged red, green and blue image signals for each chip, and generating a matrix of correction factors for each chip based on a result of comparing the averaged image signals for the plurality of chips and the averaged image signals for each chip.

6. The method of claim 5, wherein the step of generating a matrix of correction factors comprises inverting a matrix of averaged red, green and blue image signals for each chip and multiplying the inverted matrix by a matrix of averaged red, green, and blue image signals for the plurality of chips.

7. The method of claim 1, further comprising the step of generating a final correction factor matrix for each chip based on the matrix of correction factors for the array and the correction factor matrix for each chip.

8. An imaging system comprising:
   a plurality of chips, each chip having a plurality of image sensors that each correspond to a color;
   a color filter pattern positioned over the image sensors on each chip, the color filter pattern including a plurality of different colors; and
   image signal processing means for processing image signals output by each imaging element based on correction factors; the correction factors generated by a method comprising the steps of:

generating a plurality of image signals using the imaging elements in the array based on imaging a first target;

generating a first set of correction factors for each imaging element based on the first set of image signals;

generating a second set of image signals from imaging elements in the array based on imaging a second test target and the first set of correction factors;

generating a second set of correction factors for each chip based on the second set of image signals;

generating a third set of image signals based on imaging a third test target and the first and second sets of correction factors; and generating a third set of correction factors for the array based on the third set of image signals.

9. The imaging system of claim 8, wherein the second test target includes a number of different colors equal to a number of different colors in the color filter pattern.

10. The method of claim 8, wherein the second set of correction factors is generated by:

averaging image signals for each color in the color filter pattern for each chip to obtain a number of averaged image signals for each chip;

averaging the averaged image signals for each chip to obtain a number of averaged image signals for each color for the array;

comparing the averaged image signals for the array to corresponding averaged image signals for each chip; and generating a correction factor for each chip based on comparing the averaged image signals for the array to the averaged image signals for each chip.

11. The imaging system of claim 8, wherein the method of generating the correction factors further comprises the step of generating a correction factor for each chip based on the second and third sets of correction factors.

12. The imaging system of claim 8, wherein the color filter pattern includes the colors red, green and blue, the first test target is an achromatic test target, the second test target has three patches of red, green and blue, and the third test target has a plurality of patches of different colors.

13. The imaging system of claim 12, wherein the second set of correction factors comprises a 3×3 matrix of correction factors for each chip.

14. The imaging system of claim 12, wherein the third set of correction factors comprises a 3×3 matrix of correction factors for the array.

15. A method for calibrating a multi-chip imaging array, comprising the steps of:

controlling the imaging array to image a first test target and output a first set of image signals from each chip in the array;

analyzing the image signals output in response to imaging the first test target;

generating a first set of correction factors that correct for sensor-to-sensor variations based on a result of analyzing the image signals;

controlling the imaging array to image a second test target and output a second set of image signals;

analyzing the second set of image signals;

generating a second set of correction factors that correct for chip-to-chip variations based on a result of analyzing the second set of image signals;

controlling the imaging array to image a third test target and to output a third set of image signals;

analyzing the third set of image signals; and generating a third set of correction factors that correct for array-wide variations based on a result of analyzing the third set of image signals.

16. The method of claim 15, further comprising the step of generating a customized correction factor for each chip in the array based on the second and third sets of correction factors.

17. The method of claim 15, further comprising the steps of:

correcting the second set of image signals based on the first set of correction factors; and correcting the third set of image signals based on the second set of correction factors.

18. The method of claim 15, wherein the step of analyzing the second set of image signals comprises averaging image signals from each chip to generate at least one target value for each chip.

19. The method of claim 18, wherein the step of analyzing the second set of image signals comprises averaging the at least one target value for the chips in the array to generate an array target value, and comparing the array target value to the at least one target value for each chip.

20. The method of claim 19, wherein the step of generating the second set of correction factors comprises generating a correction factor for each chip based on a result of comparing the array target value to the at least one target value for each chip.

\* \* \* \* \*